(12) United States Patent
Dahlman et al.

(10) Patent No.: US 12,471,041 B2
(45) Date of Patent: Nov. 11, 2025

(54) IAB-CU MANAGED TIME-PATTERN CONFIGURATION FOR IAB INTER-NODE MEASUREMENT

(71) Applicant: Telefonaktiebolaget LM Ericsson (publ), Stockholm (SE)

(72) Inventors: Erik Dahlman, Stockholm (SE); Yezi Huang, Täby (SE); Boris Dortschy, Hägersten (SE); Lei Bao, Gothenburg (SE); Behrooz Makki, Pixbo (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 572 days.

(21) Appl. No.: 17/633,345

(22) PCT Filed: Aug. 14, 2020

(86) PCT No.: PCT/SE2020/050789
§ 371 (c)(1),
(2) Date: Feb. 7, 2022

(87) PCT Pub. No.: WO2021/034256
PCT Pub. Date: Feb. 25, 2021

(65) Prior Publication Data
US 2022/0303924 A1 Sep. 22, 2022

Related U.S. Application Data

(60) Provisional application No. 62/888,289, filed on Aug. 16, 2019.

(51) Int. Cl.
*H04W 56/00* (2009.01)
*H04L 5/00* (2006.01)
(Continued)

(52) U.S. Cl.
CPC ......... *H04W 56/001* (2013.01); *H04W 24/10* (2013.01); *H04W 88/08* (2013.01)

(58) Field of Classification Search
CPC ... H04W 56/001; H04W 24/10; H04W 88/08; H04W 88/12; H04W 92/045;
(Continued)

(56) References Cited

U.S. PATENT DOCUMENTS

2019/0350023 A1* 11/2019 Novlan ............... H04L 5/16
2020/0229271 A1* 7/2020 You ................... H04W 72/23
(Continued)

FOREIGN PATENT DOCUMENTS

CN 107959983 A 4/2018

OTHER PUBLICATIONS

International Search Report and Written Opinion dated Sep. 18, 2020 for International Application No. PCT/SE2020/050789 filed Aug. 14, 2020; consisting of 11 pages.
(Continued)

*Primary Examiner* — Xuan Lu
(74) *Attorney, Agent, or Firm* — Weisberg I.P. Law, P.A.

(57) ABSTRACT

A method, system, network nodes and apparatus are disclosed. According to one or more embodiments, a donor integrated access backhaul, IAB, node configured with a distributed unit, DU, for communicating with a wireless device and configured with a central unit, CU, for communicating with at least a first child IAB node is provided. The donor IAB node includes processing circuitry configured to indicate a determined first synchronization signaling blocks, SSB, transmission configuration, STC, for the at least first child IAB node, to the at least first child IAB node where the first STC is associated with inter-node measurement.

24 Claims, 10 Drawing Sheets

(51) Int. Cl.
  *H04L 5/16*   (2006.01)
  *H04L 27/26*  (2006.01)
  *H04W 24/10*  (2009.01)
  *H04W 88/08*  (2009.01)

(58) Field of Classification Search
  CPC ........ H04W 24/02; H04W 24/08; H04L 5/16; H04L 5/0048; H04L 5/0091; H04L 5/0032; H04L 27/2655
  USPC .......................................................... 370/503
  See application file for complete search history.

(56) References Cited

U.S. PATENT DOCUMENTS

| | | | | |
|---|---|---|---|---|
| 2020/0374735 | A1* | 11/2020 | Wei | H04L 5/0091 |
| 2021/0013959 | A1* | 1/2021 | Yuan | H04B 7/15571 |
| 2021/0212007 | A1* | 7/2021 | Liu | H04W 56/0015 |
| 2022/0104152 | A1* | 3/2022 | Wu | H04L 5/0046 |
| 2022/0167254 | A1* | 5/2022 | Miao | H04W 56/00 |

OTHER PUBLICATIONS

3GPP TSG-RAM WG1 #96-Bis R1-1904832; Title: SSB-based IAB node discovery and measurement; Agenda Item: 7.2.3.1; Source: Ericsson; Document for: Discussion; Date and Location: Apr. 8-12, 2019, Xi'an, China; consisting of 8 pages.

3GPP TSG RAN WG1 Meeting #95 R1-1812981; Title: Necessary Enhancements for NR IAB; Agenda item: 7.2.3.1; Source: Samsung; Document for: Discussion and Decision; Date and Location: Nov. 12-16, 2018; Spokane, USA; consisting of 9 pages.

3GPP TS 38.300 V15.5.0; 3rd Generation Partnership Project; Technical Specification Group Radio Access Network; NR; NR and NG-RAN Overall Description; Stage 2 (Release 15); Mar. 2019; consisting of 97 pages.

3GPP TR 38.874 V16.0.0; 3rd Generation Partnership Project; Technical Specification Group Radio Access Network; NR; Study on Integrated Access and Backhaul; (Release 16); Dec. 2018; consisting of 111 pages.

3GPP TS 38.470 V15.0.0; 3rd Generation Partnership Project; Technical Specification Group Radio Access Network; NG-RAN; F1 general aspects and principles (Release 15); Jan. 2018; consisting of 11 pages.

3GPP TSG-RAN WG1 #98 R1-1909024; Title: SSB-based IAB node discovery and measurement; Agenda Item: 7.2.3.1; Source: Ericsson; Document for: Discussion; Date and Location: Aug. 26-30, 2019, Prague, Czech Republic; consisting 7 pages.

3GPP TSG RAN WG1 Meeting #96; Title: RAN1 Chairman's Notes; Date and Location: Feb. 25-Mar. 1, 2019, Athens, Greece; consisting of 120 pages.

3GPP TSG RAN WG1 Meeting #97; Title: RAN1 Chairman's Notes; Date and Location: May 13-17, 2019, Reno, USA; consisting of 103 pages.

3GPP TSG RAN WG1 Meeting #96bis; Title: RAN1 Chairman's Notes; Date and Location: Apr. 8-12, 2019, Xi'an, China; consisting of 108 pages.

Chinese Office Action and English Summary dated Dec. 7, 2023 for Application No. 202080057690.8, consisting of 9 pages.

* cited by examiner

IAB-CU MANAGED TIME-PATTERN CONFIGURATION FOR IAB INTER-NODE MEASUREMENT

CROSS-REFERENCE TO RELATED APPLICATIONS

This application is a Submission Under 35 U.S.C. § 371 for U.S. National Stage Patent Application of International Application No.: PCT/SE2020/050789, filed Aug. 14, 2020 entitled "IAB-CU MANAGED TIME-PATTERN CONFIGURATION FOR IAB INTER-NODE MEASUREMENT," which claims priority to U.S. Provisional Application No. 62/888,289, filed Aug. 16, 2019, entitled "IAB-CU MANAGED TIME-PATTERN CONFIGURATION FOR IAB INTER-NODE MEASUREMENT," the entireties of both of which are incorporated herein by reference.

TECHNICAL FIELD

The present disclosure relates to wireless communications, and in particular, to network node (i.e., donor IAB node) management of time pattern configurations for at least one child network node (i.e., child IAB node).

BACKGROUND

Integrated Access and Backhaul (IAB) is part of the New Radio (NR) central unit (CU)-distributed unit (DU) (NR CU-DU) split to provide flexible and dense deployment of NR (also referred to as $5^{th}$ Generation (5G)) cells without densifying the transport network proportionately. FIG. 1 is a diagram of an example of an IAB deployment in which multiple IAB nodes are wirelessly connected. The IAB donor node provides a wireless interface to core network, and wireless backhauling functionality to IAB nodes. An IAB node may be a radio access network (RAN) node that supports wireless access to wireless devices and wirelessly backhauls the access traffic.

Each IAB node, as well as the IAB donor node, can create one or multiple cells to which wireless devices, as well as other IAB nodes, can connect.

In general, within NR, the transmission from the cell site of SS/PBCH blocks (SSBs) are used by wireless devices to:
 initially find a cell to connect to; and
 discover and measure on neighbor cells.

The SSB periodicity can take different values. Within one period, the SSBs can be transmitted in a burst. The maximum number (L) of SSBs in one burst (confined in one half frame) is determined by the sub-carrier spacing. For frequency range from 6 GHz to 52.6 GHz, L can be as large as 64.

An SSB can be transmitted over four consecutive OFDM symbols and includes three parts, namely:
 A primary synchronization signal (PSS) from which a wireless device can synchronize in time and frequency to the cell transmitting the SSB;
 A secondary synchronization signal (SSS) from which a wireless device can eventually acquire the physical cell identity (PCI) of the cell transmitting the SSB; and
 A Physical Broadcast Channel (PBCH) which includes a very limited amount of system information that a wireless device may need before it can connect to the cell. One part of this information can be included in the Master Information Block (MIB).

With the introduction of IAB in NR 3GPP Rel-16, it is expected that IAB nodes may also use SSBs transmitted from IAB donor nodes or other IAB nodes to find cells to access and for neighbor node/cell discovery and measurement.

According to the IAB system information, the backhaul link discovery and measurement procedure is performed in two stages:
 Stage 1: initial IAB-node discovery which follows 3GPP standards such as 3GPP Rel-15 initial access procedure;
 Stage 2: inter-IAB-node discovery and measurement;
In Stage 2, there are two SSB-based solutions for IAB inter-node measurement identified which in the design may take into account the half-duplex constraint at an IAB-node and multi-hop topologies.

However, there are still various issues relating to backhaul link discovery and measurement procedure using SSB measurement and configuration as existing systems lack the flexibility to dynamically update/manage SSB measurement and configurations in IAB networks.

SUMMARY

Some embodiments advantageously provide methods, IAB nodes, systems, and apparatuses network node (i.e., donor IAB node) management of time pattern configurations for at least one child network node (i.e., child IAB node).

According to one aspect of the disclosure, a donor integrated access backhaul, IAB, node configured with a distributed unit, DU, for communicating with a wireless device and configured with a central unit, CU, for communicating with at least a first child IAB node is provided. The donor IAB node includes processing circuitry configured to indicate a determined first synchronization signaling blocks, SSB, transmission configuration, STC, for the at least first child IAB node, to the at least first child IAB node where the first STC is associated with inter-node measurement.

According to one or more embodiments of this aspect, the first STC is determined by the CU of the donor IAB node. According to one or more embodiments of this aspect, the processing circuitry is further configured to: receive, from an operation, administration and management, OAM, unit, an indication of a second STC that has been preconfigured, the second STC being different from the first STC; and reconfigure the first child IAB node from the second STC to the first STC by causing the second STC to be overwritten with the first STC. According to one or more embodiments of this aspect, the processing circuitry is further configured to: determine a plurality of STCs for a plurality of child IAB nodes where the plurality of STCs are associated with inter-node measurement and including the first STC and the plurality of child IAB nodes including the first child IAB node; and indicate the plurality of STCs to the plurality of child IAB nodes.

According to one or more embodiments of this aspect, the determination of the first STC for the first child IAB node to perform inter-node measurement is based at least on STC time pattern information and synchronization signaling block, SSB, measurement timing configuration, SMTC, time pattern information for a plurality of DUs, and mobile termination, MTs, associated with a plurality of child IAB nodes and managed by the donor IAB node. According to one or more embodiments of this aspect, the first STC indicates whether one or more SSBs are able to be muted by the first child IAB node. According to one or more embodiments of this aspect, the indication of the first STC to the first child IAB node is provided in system information over an F1 interface between the CU of the donor IAB node and a DU of the first child IAB node.

According to one or more embodiments of this aspect, the processing circuitry is configured to: determine at least a subset of a plurality of STCs for the first child IAB node where the at least the subset of the plurality of STCs include the first STC; and indicate the at least the subset of the plurality of STCs to the first child IAB node to participate in inter-node measurement using one of the at least the subset of the plurality of STCs. According to one or more embodiments of this aspect, the processing circuitry is further configured to receive an indication of one of the at least the subset of the plurality of STCs selected by the child IAB node to participate in inter-node measurement. According to one or more embodiments of this aspect, the processing circuitry further configured to: determine a predefined IAB event occurred; and trigger the determination of the first STC for the first child IAB node based at least on the occurrence of the predefined IAB event.

According to one or more embodiments of this aspect, the predefined IAB event is an IAB network topology change associated with one of an addition and removal of a child IAB node from the IAB network topology; and the processing circuitry being further configured to reconfigure an STC associated with at least one remaining child IAB node in the IAB network topology in response to the IAB network topology change. According to one or more embodiments of this aspect, the first STC indicates at least one of: at least one time domain pattern for performing at least one SSB transmission associated with inter-node measurement, and at least one time domain pattern for performing at least one SSB measurement associated with inter-node measurement. According to one or more embodiments of this aspect, the first STC is determined and managed by the CU of the donor IAB node.

According to another aspect of the disclosure, a first child integrated access backhaul, IAB, node configured with a distributed unit, DU, for communicating with a wireless device and configured with a mobile termination, MT, for communicating with a donor IAB node is provided. The first child IAB node includes processing circuitry configured to: receive, from the donor IAB node, an indication of a first synchronization signaling blocks, SSB, transmission configuration, STC, associated with inter-node measurement; and perform an operation associated with inter-node measurement using the first STC.

According to one or more embodiments of this aspect, the first STC is communicated from a central unit, CU, of the donor IAB node that determined the first STC. According to one or more embodiments of this aspect, the first STC is different from an STC assigned to the first child IAB node by an operation, administration and management, OAM, unit. According to one or more embodiments of this aspect, the first STC for the first child IAB node is based at least on STC time pattern information and synchronization signaling block, SSB, measurement timing configuration, SMTC, time pattern information for a plurality of DUs, and mobile terminations, MTs, associated with a plurality of child IAB nodes that are managed by the donor IAB node where the plurality of child IAB nodes includes the first child IAB node.

According to one or more embodiments of this aspect, the first STC indicates whether one or more SSBs are able to be muted by the first child IAB node. According to one or more embodiments of this aspect, the indication of at least the first STC to the first child IAB node is received in system information over an F1 interface between a central unit, CU, of the donor IAB node and the DU of the first child IAB node. According to one or more embodiments of this aspect, the at least the first STC corresponds at least a subset of a plurality of STCs including the first STC; and the processing circuitry is further configured to select the first STC from among the at least the subset of the plurality of STCs.

According to one or more embodiments of this aspect, the processing circuitry is further configured to transmit an indication that the first STC has been selected. According to one or more embodiments of this aspect, the first STC indicates at least one of: at least one time domain pattern for performing at least one SSB transmission associated with inter-node measurement, and at least one time domain pattern for performing at least one SSB measurement associated with inter-node measurement. According to one or more embodiments of this aspect, the operation associated with inter-node measurement using the first STC corresponds to SSB transmission associated with inter-node measurement.

According to another aspect of the disclosure, a method implemented by a donor integrated access backhaul, IAB, node that is configured with a distributed unit, DU, for communicating with a wireless device and configured with a central unit, CU, for communicating with at least a first child IAB node is provided. A determined first synchronization signaling blocks, SSB, transmission configuration, STC, for the at least first child IAB node is indicated to the at least first child IAB node where the first STC is associated with inter-node measurement.

According to one or more embodiments of this aspect, the first STC is determined by the CU of the donor IAB node. According to one or more embodiments of this aspect, an indication of a second STC that has been preconfigured is received from an operation administration and management, OAM, unit where the second STC is different from the first STC, and the first child IAB node is reconfigured from the second STC to the first STC by causing the second STC to be overwritten with the first STC. According to one or more embodiments of this aspect, a plurality of STCs are determined for a plurality of child IAB nodes where the plurality of STCs are associated with inter-node measurement and including the first STC and the plurality of child IAB nodes including the first child IAB node; and the plurality of STCs are indicated to the plurality of child IAB nodes. According to one or more embodiments of this aspect, the determination of the first STC for the first child IAB node to perform inter-node measurement is based at least on STC time pattern information and synchronization signaling block, SSB, measurement timing configuration, SMTC, time pattern information for a plurality of DUs, and mobile termination, MTs, associated with a plurality of child IAB nodes and managed by the donor IAB node.

According to one or more embodiments of this aspect, the first STC indicates whether one or more SSBs are able to be muted by the first child IAB node. According to one or more embodiments of this aspect, the indication of the first STC to the first child IAB node is provided in system information over an F1 interface between the CU of the donor IAB node and a DU of the first child IAB node. According to one or more embodiments of this aspect, at least a subset of a plurality of STCs are determined for the first child IAB node where the at least the subset of the plurality of STCs include the first STC, and the at least the subset of the plurality of STCs is indicated to the first child IAB node to participate in inter-node measurement using one of the at least the subset of the plurality of STCs.

According to one or more embodiments of this aspect, an indication is received of one of the at least the subset of the plurality of STCs selected by the child IAB node to participate in inter-node measurement. According to one or more embodiments of this aspect, a predefined IAB event is determined to have occurred where the determination of the first STC for the first child IAB node triggers based at least on the occurrence of the predefined IAB event. According to one or more embodiments of this aspect, the predefined IAB event is an IAB network topology change associated with one of an addition and removal of a child IAB node from the IAB network topology, and an STC associated with at least one remaining child IAB node in the IAB network topology is configured in response to the IAB network topology change. According to one or more embodiments of this aspect, the first STC indicates at least one of: at least one time domain pattern for performing at least one SSB transmission associated with inter-node measurement, and at least one time domain pattern for performing at least one SSB measurement associated with inter-node measurement. According to one or more embodiments of this aspect, the first STC is determined and managed by the CU of the donor IAB node.

According to another aspect of the disclosure, a method implemented by a first child integrated access backhaul, IAB, node that is configured with a distributed unit, DU, for communicating with a wireless device and configured with a mobile termination, MT, for communicating with a donor IAB node is provided. An indication of a first synchronization signaling blocks, SSB, transmission configuration, STC, associated with inter-node measurement is received from the donor IAB node, and an operation associated with inter-node measurement using the first STC is performed.

According to one or more embodiments of this aspect, the first STC is communicated from a central unit, CU, of the donor IAB node that determined the first STC. According to one or more embodiments of this aspect, the first STC is different from an STC assigned to the first child IAB node by an operation, administration and management, OAM, unit. According to one or more embodiments of this aspect, the first STC for the first child IAB node is based at least on STC time pattern information and synchronization signaling block, SSB, measurement timing configuration, SMTC, time pattern information for a plurality of DUs, and mobile terminations, MTs, associated with a plurality of child IAB nodes that are managed by the donor IAB node where the plurality of child IAB nodes include the first child IAB node.

According to one or more embodiments of this aspect, the first STC indicates whether one or more SSBs are able to be muted by the first child IAB node. According to one or more embodiments of this aspect, the indication of at least the first STC to the first child IAB node is received in system information over an F1 interface between a central unit, CU, of the donor IAB node and the DU of the first child IAB node. According to one or more embodiments of this aspect, the at least the first STC corresponds at least a subset of a plurality of STCs including the first STC, and the first STC is selected from among the at least the subset of the plurality of STCs.

According to one or more embodiments of this aspect, an indication that the first STC has been selected is transmitted. According to one or more embodiments of this aspect, the first STC indicates at least one of: at least one time domain pattern for performing at least one SSB transmission associated with inter-node measurement, and at least one time domain pattern for performing at least one SSB measurement associated with inter-node measurement. According to one or more embodiments of this aspect, the operation associated with inter-node measurement using the first STC corresponds to SSB transmission associated with inter-node measurement.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Some discussion from 3GPP are provided below. Discussion from 3GPP Technical Report (TR) 38.874 is as follows:
SSB-Based Solutions (Solution 1-A and 1-B):
  Solution 1-A) Reusing the same set of SSBs used for access wireless devices:
    In this case, the SSBs for inter-IAB cell search in stage 2 are on the currently defined sync raster for a SA frequency layer, while for a NSA frequency layer the SSBs are transmitted inside of the synchronization signaling block, SSB, measurement timing configuration, SMTC, configured for access wireless devices. As used herein SMTC also refer to synchronization signal (SS)/physical broadcast channel (PBCH) block measurement timing configuration.
  Solution 1-B) Use of SSBs which are orthogonal (TDM and/or FDM) with SSBs used for access wireless devices:
    In this case, the SSBs, that may get muted, for inter-IAB cell search and measurement in stage 2 are not on the currently defined sync raster for a SA frequency layer, while for a NSA frequency layer the SSBs are transmitted outside of the SMTC configured for access wireless devices.

An IAB-node may not mute its own SSB transmissions targeting the wireless device cell search and measurement when doing inter-IAB cell search in stage 2:

For SA, this indicates that SSBs transmitted on the currently defined sync raster follow the currently defined periodicity for initial access;

In case of Solution 1-B, this indicates SSBs, that may get muted, for inter-IAB stage 2 cell search is at least TDM with SSBs used for wireless device cell search and measurements.

End Discussion from TR 38.874

Solution 1-A which uses the on-raster SSBs is already supported by the current 3GPP Rel-15 specification. As discussed in the 3GPP TR 38.874, additional flexibility in SSB configuration can be introduced to the off-raster SSBs used in Solution 1-B, for example to allocate additional time-domain positions on a channel raster for SSB transmission. One option is to support transmission of off-raster SSB in any half-frame and within multiple half frames.

Integrated Access Backhaul Architectures

Figure 1:
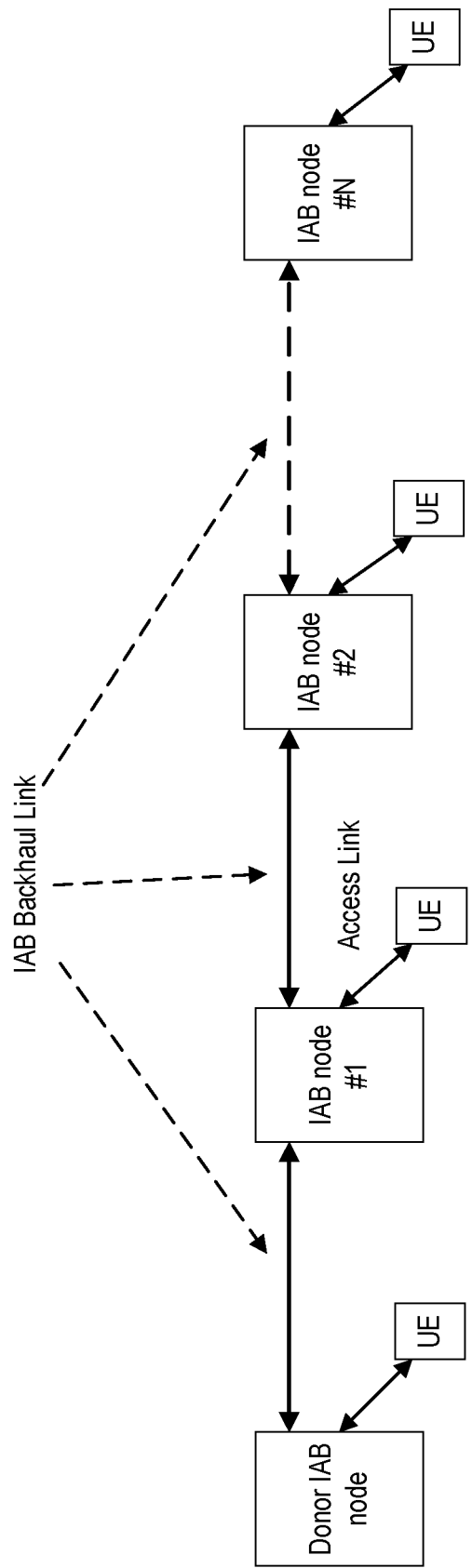
FIG. 1 is a diagram of an IAB network.
Figure 2:
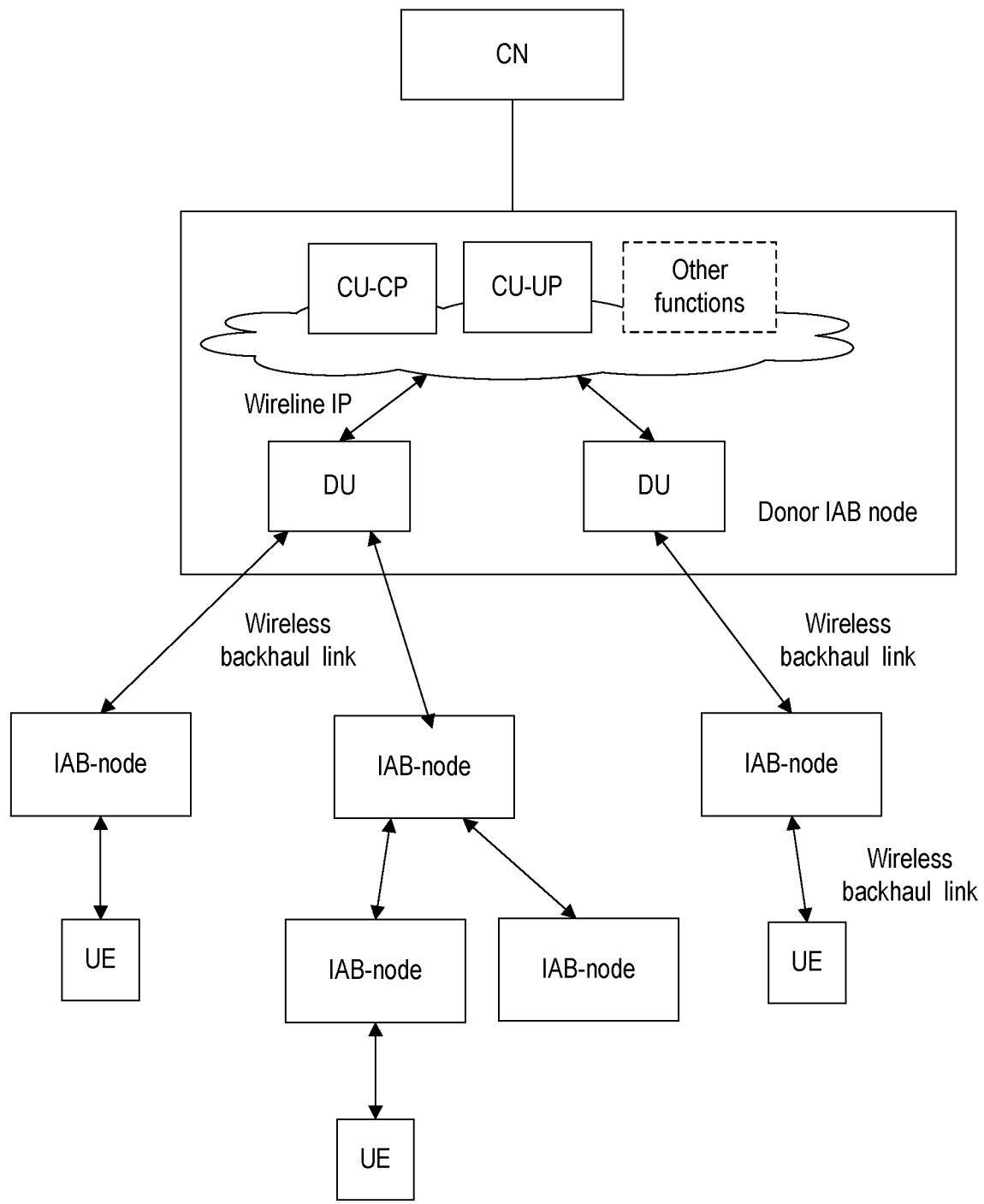
FIG. 2 is diagram for IAB architectures such as SA mode.

It was also discussed in a 3GPP study item that the IAB system architecture may apply CU-DU split. FIG. 2 is a diagram of a reference diagram for IAB in standalone mode, which contains one IAB-donor and multiple IAB-nodes.

In 3GPP, different architectures for supporting user plane traffic over IAB node have been described such as in 3GPP TS 38.874 v16.0.0, namely architecture groups 1 and 2. Of these architectures, option 1a may be recommended and depicted in FIG. 3 that is a diagram for architecture 1a (SA-mode with NGC).

Architecture 1a leverages CU/DU-split architecture. In this architecture 1a, each IAB-node holds a Mobile Termination (MT) and a DU. In an IAB node, the MT function is a logic unit which terminates the backhaul radio interface toward the IAB parent node. Via the MT, the IAB-node connects to an upstream IAB-node or the IAB-donor. Via the DU, the IAB-node establishes RLC-channels to wireless devices and to MTs of downstream IAB-nodes. For MTs, this RLC-channel may refer to a modified RLC*. An IAB-node can connect to more than one upstream IAB-node or IAB-donor DU. The IAB-node may contain multiple DUs, but each DU part of the IAB-node has F1-C connection only with one IAB-donor CU-CP.

The donor node also holds/includes a DU to support wireless devices and MTs of downstream IAB-nodes. The IAB-donor holds/includes a CU for the DUs of all IAB-nodes and for its own DU. It is assumed that the DUs on an IAB-node are served by only one IAB-donor. This IAB-donor node may change through topology adaptation. Each DU of an IAB-node connects to the CU in the IAB-donor using a F1, potentially in a modified form version, which is referred to as F1*. F1*-U runs over RLC channels on the wireless backhaul between the MT on the serving IAB-node and the DU on the donor. An adaptation layer is added, which holds routing information, enabling forwarding. It replaces the IP functionality of the standard F1-stack. F1*-U may carry a GTP-U header for the end-to-end association between CU and DU. In a further enhancement, information carried inside the GTP-U header may be included into the adaption layer. Further, optimizations to RLC may be considered such as applying ARQ only on the end-to-end connection opposed to hop-by-hop.

Figure 3:
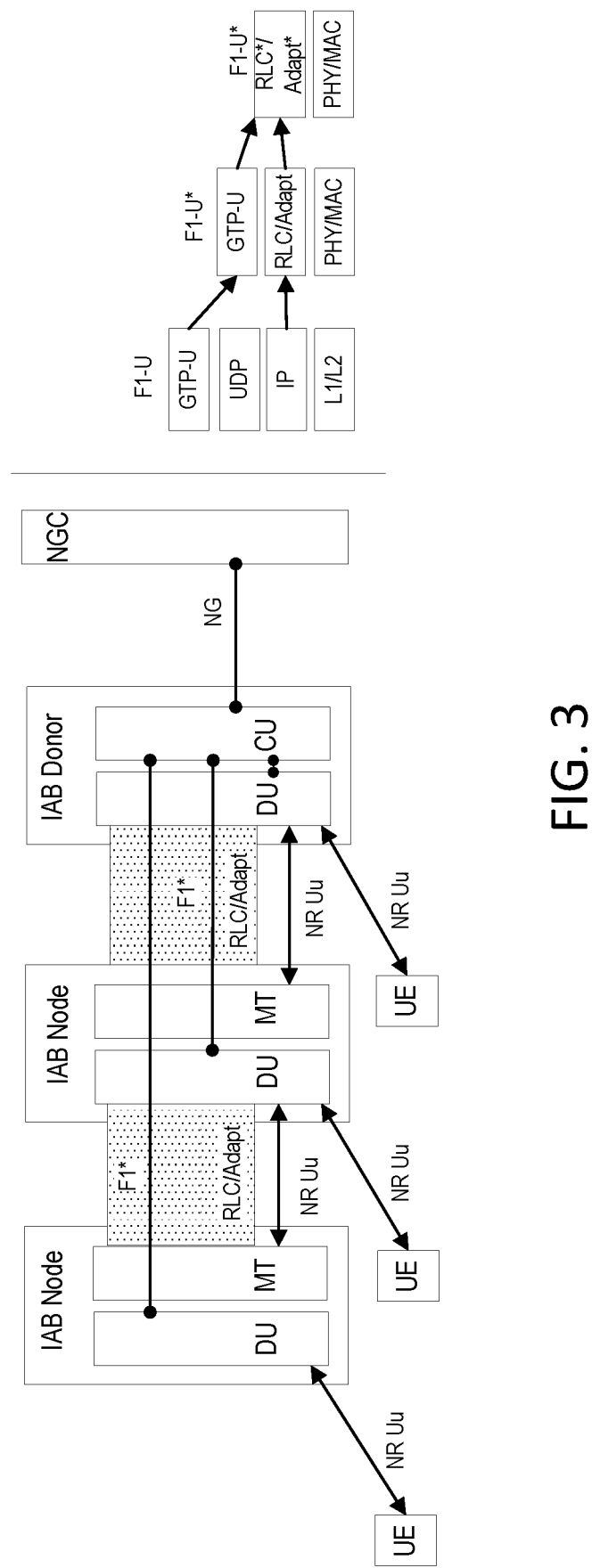
FIG. 3 is a diagram for architecture 1a such as SA-mode with NGC.

The right side of FIG. 3 illustrates two examples of such F1*-U protocol stacks. In FIG. 3, enhancements of RLC are referred to as RLC*. The MT of each IAB-node further sustains NAS connectivity to the NGC, e.g., for authentication of the IAB-node. It may further sustain a PDU-session via the NGC, e.g., to provide the IAB-node with connectivity to the Operation, Administration and Management (OAM) function.

For NSA operation with EPC, the MT is dual-connected with the network using EN-DC. The IAB-node's MT sustains a PDN connection with the EPC, e.g., to provide the IAB-node with connectivity to the OAM.

Details of F1*, the adaptation layer and RLC* are under investigation in 3GPP.

Discussion from 3GPP TS 38.470

Scheduling of system broadcast information is carried out in the gNB-DU, i.e., IAB node-DU. The gNB-DU may be responsible for transmitting the system information according to the scheduling parameters available.

The gNB-DU may be responsible for the encoding of NR-MIB. In case broadcast of SIB1 and other SI messages may be needed, the gNB-DU may be responsible for the encoding of SIB1 and the gNB-CU is responsible for the encoding of other SI messages.

End of Discussion from TS 38.470

In parallel to SSB transmission by the DU, wireless devices and MTs of IAB-nodes are configured to search for and measure on SSBs at specific time instance and/or specific time periods (SSB/PBCH Measurement Time Configuration). The DU and MT configuration may be jointly configured to enable inter-node SSB measurements while not violating the IAB half-duplex constraint.

The following objectives of IAB work item have been considered:

The configurable values of the parameters in STC (e.g., SSB transmission configuration) for IAB node discovery and measurement are provided in the following:

SSB center frequency:

SSB subcarrier spacing:

SSB transmission periodicity:

SSB transmission timing offset in half frame(s)

The index of SSBs to transmit (the SSBs to be transmitted in the half frame)

For Further Study (FFS) additional parameter(s) other than above

For IAB node discovery and measurement, the maximum number of STCs that can be configured for an IAB node DU per cell at one frequency location is 4.

Several challenges have been identified in existing systems and/or in the 3GPP discussions above regarding the inter-node measurement in an IAB network. First, due to the half-duplex constraint, a network node such as an IAB node may not be able to transmit and measure SSBs at the same time. To enable inter-node measurement given the half-duplex constraint, orthogonal time-domain transmission and reception patterns between different network nodes, i.e., IAB nodes, may be implemented. The network nodes in a network may need different time-domain SSB transmission patterns that provide timewise orthogonal opportunities for SSB measurements. Secondly, in CU-DU split architecture scheduling of system broadcast information (MIB and SIB1) is performed by the IAB (e.g., gNB) node-DU, meaning that the IAB node-CU does not directly configure the SSB transmission. In some systems, SSB transmission parameters are (pre-)configured by the Operation, Administration and Management (OAM) function. Modification/update of STCs is also carried out by the OAM. OAM-based reconfiguration is in general performed manually by the operator and the interactions with OAM often introduce temporary breakdown of the operational network. In the IAB case, pure OAM-based STC re-configuration may not be practical, especially if topology adaption occurs frequently and if failure of the parent link will have a big impact for the child nodes. It is therefore advantageous for the re-selection and recovery of the parent backhaul to occur quickly.

Further, in some system, each IAB node may be configured with at most 4 STCs and SMTCs where SMTCs are used for measuring signalling from other IAB nodes while STCs enable other IAB nodes to measure this signalling from the other IAB node. Since an IAB node is not able to transmit and receive/measure at the same time, coordination of STC and SMTC is needed to enable inter-IAB node measurement.

The descriptions in the present disclosure advantageously provide an efficient method to provide a network node, i.e., IAB node, with time domain patterns. As used herein time domain pattern(s) (also referred to as time pattern(s), time domain communication patterns, etc.) may include/correspond to STC patterns (SBB transmission configuration patterns) and/or SMTC patterns (SSB measurement timing configuration measurement pattern). While in some systems the transmission pattern is configured by the OAM and the measurement pattern is configured by the IAB node-CU, one or more embodiments described herein advantageously configure the IAB node-CU to manage both the STC pattern and SMTC pattern, jointly, such as to allow the IAB node-CU to manage IAB node discovery and measurement.

According to one or more embodiments, the IAB node-CU of the IAB node such as of the donor IAB node manages the time-domain patterns which releases the burden for the OAM and reduces signaling exchange between the OAM and IAB node-CU. The impact on the operational network may also be limited if the interaction with OAM is reduced. The IAB node-CU has knowledge about its child network nodes such as child IAB-nodes and their time domain SSB patterns. In one or more embodiments, the IAB node-CU may be in charge of system information exchange with other IAB nodes-CUs. Based on the network condition, the IAB node-CU can efficiently coordinate the time-domain patterns among the child network nodes. Such functional enhancement simplifies the coordination of SSB transmission and measurement among multiple network nodes in the network. The scheme described herein may also be useful to assist an IAB node-DU to make coordinated muting decision and to set up a proper measurement plan. Sensible and fair muting decisions may be important to ensure mutual inter-node measurement work among a group of network nodes, especially when there is a need to co-schedule more network nodes to improve the efficiency of inter-node measurement.

Before describing in detail exemplary embodiments, it is noted that the embodiments reside primarily in combinations of apparatus components and processing steps related to network node (i.e., IAB nodes such as a donor IAB node) management of time pattern configurations for at least one child network node (i.e., child IAB node. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node such a donor IAB node or a child IAB node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

The term network node and/or node, as used herein, is interchangeable with IAB node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

As used herein, inter node measurement corresponds to inter-IAB node measurement that is a measurement between multiple IAB nodes. In non-IAB networks, measurement is typically between wireless devices and network nodes or on access links. In an IAB network, the measurement is between IAB nodes or backhaul links. For example, the inter-IAB node measurement may be associated with STC, SMTC, synchronization and/or other signaling on the backhaul link between IAB nodes that can be measured by the IAB nodes.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal and/or from a donor IAB node toward a child IAB node. Transmitting in uplink may pertain to transmission from the terminal to the network or network node and/or from a child IAB node toward the donor IAB node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 4:
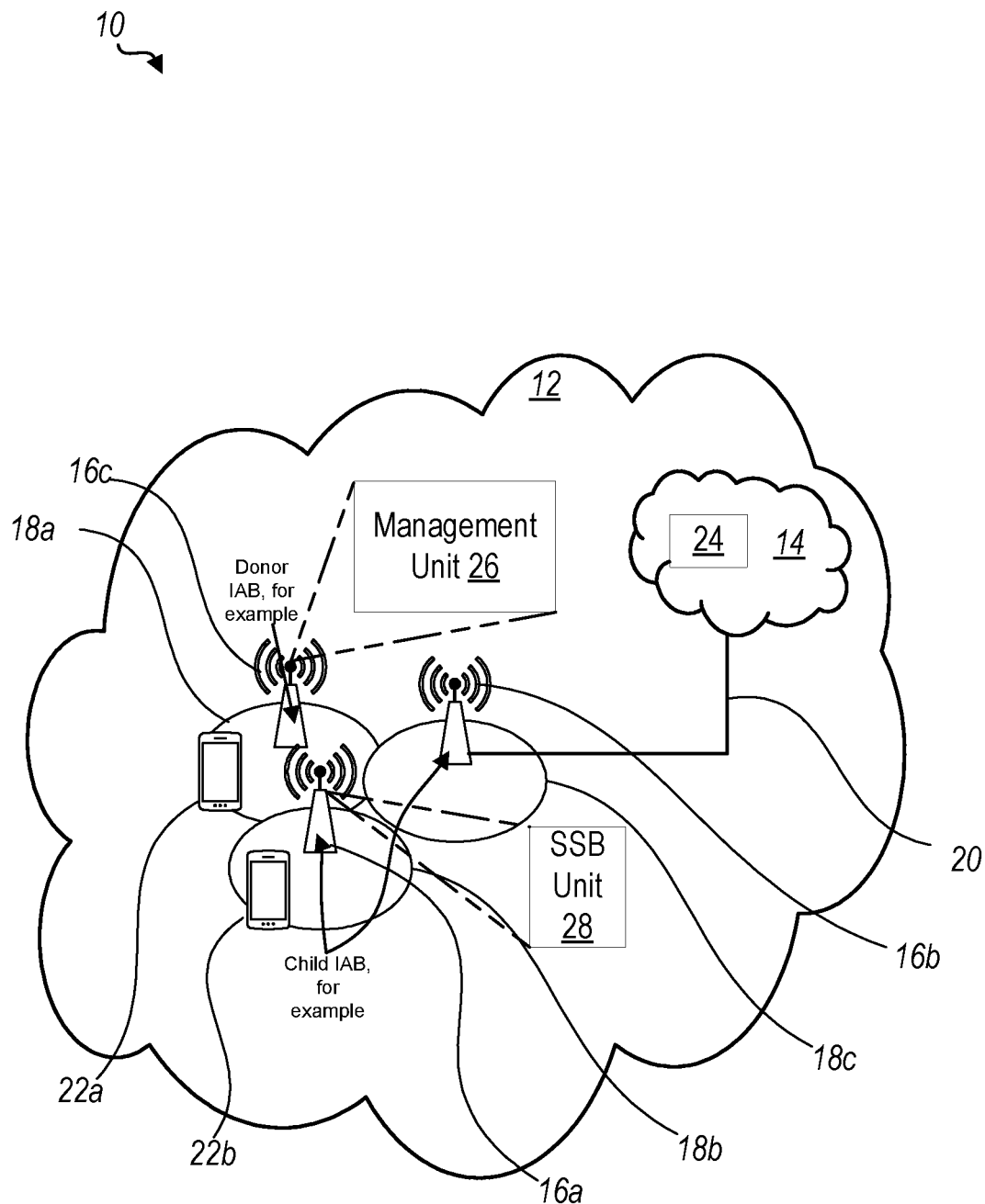
FIG. 4 is a schematic diagram of an exemplary network architecture according to the principles in the present disclosure.

Embodiments provide donor TAB node management of time pattern configurations for at least one child IAB node. Referring now to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). In one example network node 16c is a donor IAB node while network nodes 16a and 16b are each child IAB nodes. Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to an OAM 24, which may be embodied in the hardware and/or software of a standalone server, a cloud-implemented server, a distributed server or as processing resources in a server farm in core network 14 as is generally known in the art. The OAM 24 may include hardware components similar to those described herein with reference to the network node 16.

A network node 16 is configured to include a management unit 26 which is configured to perform one or more network node 16 function as described herein such as with respect to time domain pattern configuration management which may include STC patterns (SBB transmission configuration patterns) management and/or SMTC patterns (SSB measurement timing configuration measurement pattern) management. A network node 16 is configured to include a SSB unit 28 which is configured to perform one or more network node 16 function as described herein such as with respect to time domain pattern configuration management which may include STC patterns (SBB transmission configuration patterns) management and/or SMTC patterns (SSB measurement timing configuration measurement pattern) management.

Example implementations, in accordance with an embodiment, of the WD 22, network node 16 and OAM 24 discussed in the preceding paragraphs will now be described with reference to FIG. 5. The general configuration of OAM in the core network 14 such a via software and/or hardware is known in the art and will not be further described.

The communication system 10 further includes a network node 16 provided in a communication system 10 and including hardware 30 enabling it to communicate with the WD 22 and other network nodes 16. The hardware 30 may include a communication interface 32 for setting up and maintaining a wired or wireless connection with an interface of a different communication device of the communication system 10, as well as a radio interface 34 for setting up and maintaining at least a wireless connection with a WD 22 located in a coverage area 18 served by the network node 16, and/or with other network nodes 16 such as in an IAB network. The radio interface 34 may be formed as or may include, for example, one or more RF transmitters, one or more RF receivers, and/or one or more RF transceivers. The communication interface 32 may be configured to facilitate a connection with one or more entities in system 10.

In the embodiment shown, the hardware 30 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may optionally include management unit 26 configured to perform one or more network node 16 functions as described herein such as with respect time domain pattern (e.g., STC and/or SMTC pattern management) and/or management by donor IAB node 16 such as if the network node 16 is a donor IAB node 16. In one or more embodiments, donor IAB node 16 includes IAB node 16-CU and IAB node 16-DU (not shown) whose functions are described herein. The processing circuitry 36 may optionally also include SSB unit 28 configured to perform one or more network node 16 functions as described herein such as with respect to time domain pattern configuration management which may include STC patterns (SBB transmission configuration patterns) management and/or SMTC patterns (SSB measurement timing configuration measurement pattern) management such as if network node 16 is a child IAB node 16. In one or more embodiments, child IAB node 16 includes IAB node 16-DU and IAB node 16-MT (not shown) whose functions are described herein. Hence, while network nodes 16 are generally referred to as network node 16, a network node 16 be a donor IAB node 16, while other network nodes 16 are child IAB nodes 16.

The communication system 10 further includes the WD 22 already referred to. The WD 22 may have hardware 44 that may include a radio interface 46 configured to set up and maintain a wireless connection 64 with a network node 16 serving a coverage area 18 in which the WD 22 is currently located. The radio interface 46 may be formed as or may include, for example, one or more RF transmitters, one or more RF receivers, and/or one or more RF transceivers.

The hardware 44 of the WD 22 further includes processing circuitry 48. The processing circuitry 48 may include a processor 50 and memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from) memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 54, which is stored in, for example, memory 52 at the WD 22, or stored in external memory (e.g., database, storage array, network storage device, etc.) accessible by the WD 22. The software 54 may be executable by the processing circuitry 48. The software 54 may include a client application 56. The client application 56 may be operable to provide a service to a human or non-human user via the WD 22. The client application 56 may interact with the user to generate the user data that it provides.

The processing circuitry 48 may be configured to control any of the methods and/or processes described herein and/or to cause such methods, and/or processes to be performed, e.g., by WD 22. The processor 50 corresponds to one or more processors 50 for performing WD 22 functions described herein. The WD 22 includes memory 52 that is configured to store data, programmatic software code and/or other information described herein. In some embodiments, the software 54 and/or the client application 56 may include instructions that, when executed by the processor 50 and/or processing circuitry 48, causes the processor 50 and/or processing circuitry 48 to perform the processes described herein with respect to WD 22.

Figure 5:
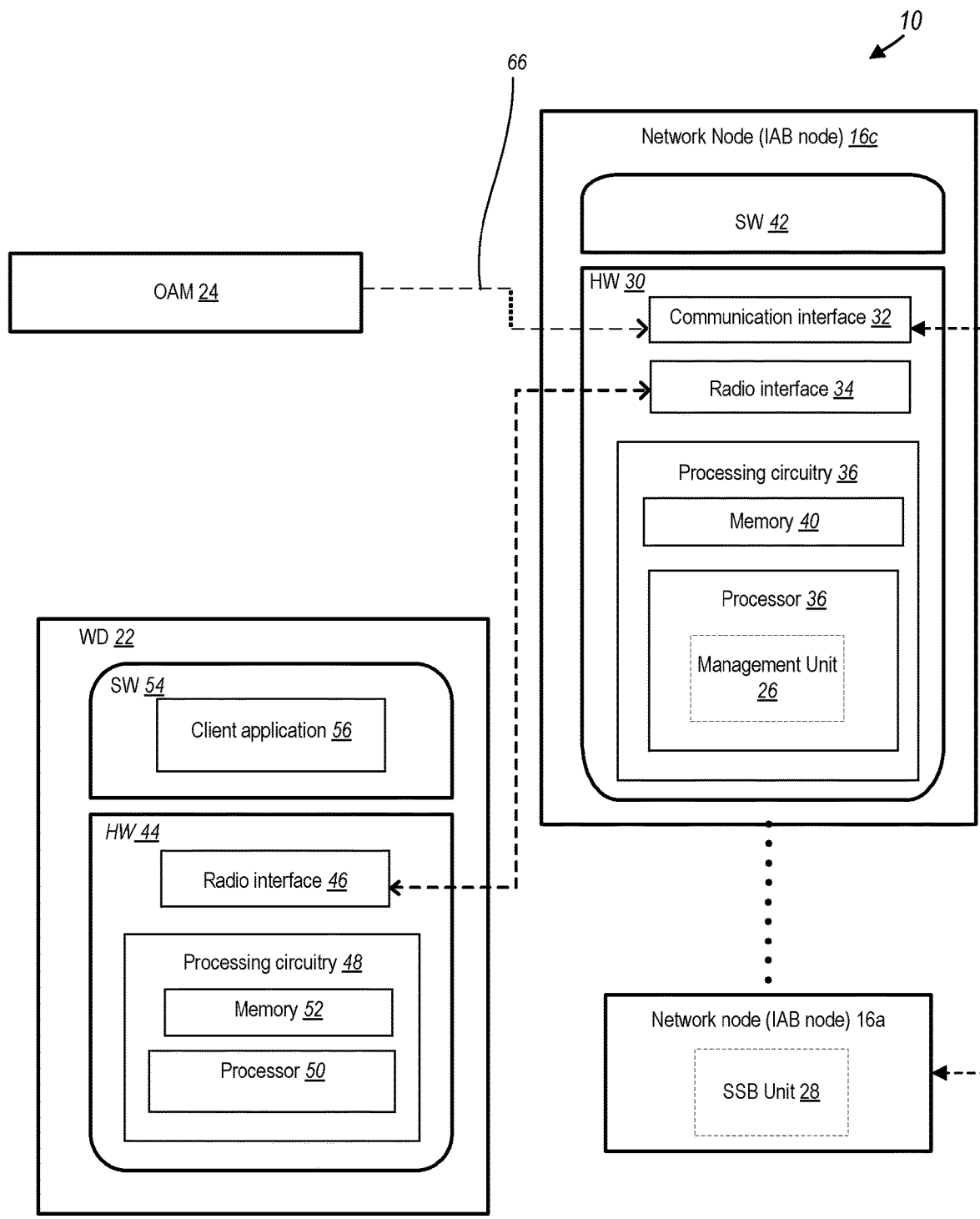
FIG. 5 is a block diagram of various entities from FIG. 4 according to some embodiments of the present disclosure.

In some embodiments, the inner workings of the network node 16 and WD 22 may be as shown in FIG. 5 and independently, the surrounding network topology may be that of FIG. 4.

The wireless connection between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve.

In some embodiments, the cellular network also includes the network node 16 with a radio interface. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

Although FIGS. 4 and 5 show various "units" such as management unit 26 and SSB unit 28 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 6:
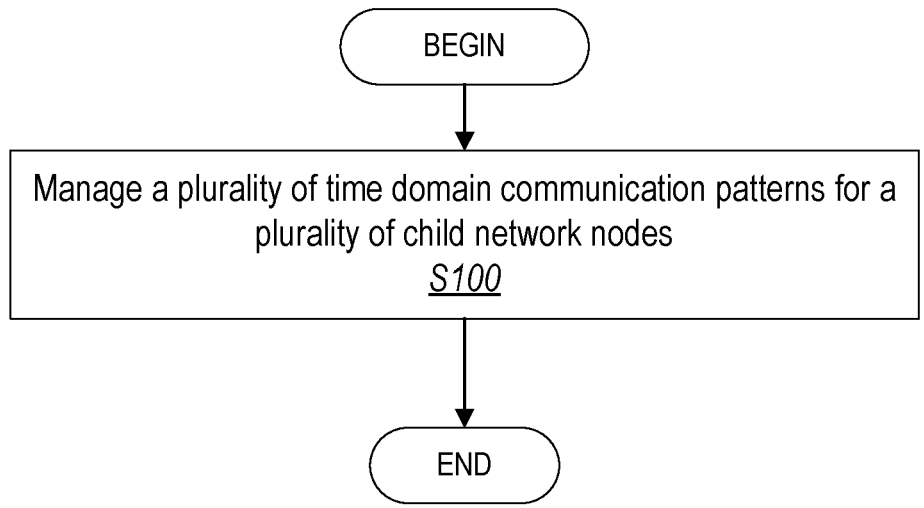
FIG. 6 is a flowchart of an example process in a network node such as a donor IAB node according to some embodiments of the present disclosure.

FIG. 6 is a flowchart of an exemplary process in a network node 16 (e.g., donor IAB node 16) according to one or more embodiments of the disclosure. One or more Blocks and/or functions performed by network node 16 may be performed by one or more elements of network node 16 such as by management unit 26 in processing circuitry 36, processor 38, radio interface 34, etc. In one or more embodiments, network node 16 such as via one or more of processing circuitry 36, processor 38, management unit 26, communication interface 32 and radio interface 34 is configured to manage (Block S100) a plurality of time domain communication patterns for a plurality of child network nodes 16 (child IAB nodes 16), as described herein.

According to one or more embodiments, each of the time domain communication patterns is associated with SSB for one or SSB transmission and SSB measurement. According to one or more embodiments, the donor network node 16 is a donor IAB node and the plurality of child network nodes 16 are a plurality of child IAB nodes. According to one or more embodiments, each time domain communication pattern corresponds to at least one SSB transmission configuration, STC, parameter.

Figure 7:
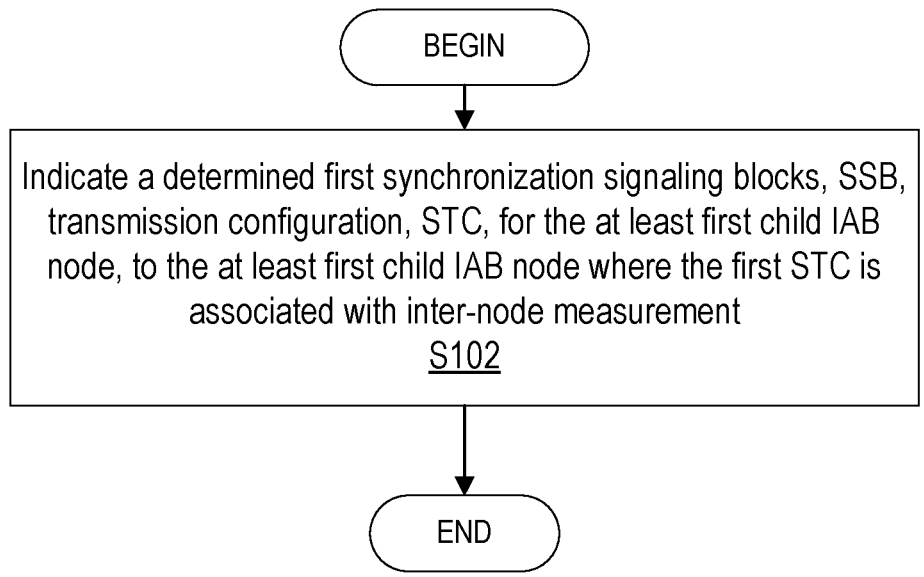
FIG. 7 is a flowchart of another example process in a network node such as a donor IAB node according to some embodiments of the present disclosure.

FIG. 7 is a flowchart of an exemplary process in a network node 16 (e.g., donor IAB node 16) according to one or more embodiments of the disclosure. One or more Blocks and/or functions performed by network node 16 may be performed by one or more elements of donor IAB node 16 such as by management unit 26 in processing circuitry 36, processor 38, radio interface 34, etc. In one or more embodiments, a donor IAB network node 16 configured with a distributed unit, DU, for communicating with a wireless device 22 and configured with a central unit, CU, for communicating with at least a first child IAB node 16. In one or more embodiments, donor IAB node 16 such as via one or more of processing circuitry 36, processor 38, management unit 26, communication interface 32 and radio interface 34 is configured to indicate (S102) a determined first synchronization signaling blocks, SSB, transmission configuration, STC, for the at least first child IAB node (16), to the at least first child IAB node (16) where the first STC is associated with inter-node measurement, as described herein.

According to one or more embodiments, the first STC is determined by the CU of the donor IAB node 16. According to one or more embodiments, the processing circuitry 36 is further configured to: receive, from an operation, administration and management, OAM, unit, an indication of a second STC that has been preconfigured, the second STC being different from the first STC, and reconfigure the first child IAB node 16 from the second STC to the first STC by causing the second STC to be overwritten with the first STC. According to one or more embodiments, the processing circuitry 36 is further configured to: determine a plurality of STCs for a plurality of child IAB nodes 16, the plurality of STCs being associated with inter-node measurement and including the first STC and the plurality of child IAB nodes 16 including the first child IAB node 16; and indicate the plurality of STCs to the plurality of child IAB nodes 16.

According to one or more embodiments, the determination of the first STC for the first child IAB node 16 to perform inter-node measurement is based at least on STC time pattern information and synchronization signaling block, SSB, measurement timing configuration, SMTC, time pattern information for a plurality of DUs, and mobile termination, MTs, associated with a plurality of child IAB nodes 16 and managed by the donor IAB node 16. According to one or more embodiments, the first STC indicates whether one or more SSBs are able to be muted by the first child IAB node 16.

According to one or more embodiments, the indication of the first STC to the first child IAB node 16 is provided in system information over an F1 interface between the CU of the donor IAB node 16 and a DU of the first child IAB node 16. According to one or more embodiments, the processing circuitry 36 is configured to: determine at least a subset of a plurality of STCs for the first child IAB node 16 where the at least the subset of the plurality of STCs includes the first STC; and indicate the at least the subset of the plurality of STCs to the first child IAB node 16 to participate in inter-node measurement using one of the at least the subset of the plurality of STCs. According to one or more embodiments, the processing circuitry 36 is further configured to receive an indication of one of the at least the subset of the plurality of STCs selected by the child IAB node 16 to participate in inter-node measurement.

According to one or more embodiments, the processing circuitry 36 further configured to: determine a predefined IAB event occurred; and trigger the determination of the first STC for the first child IAB node 16 based at least on the occurrence of the predefined IAB event. According to one or more embodiments, the predefined IAB event is an IAB network topology change associated with one of an addition and removal of a child IAB node 16 from the IAB network topology; and the processing circuitry 36 is further configured to reconfigure an STC associated with at least one remaining child IAB node 16 in the IAB network topology in response to the IAB network topology change. According to one or more embodiments, the first STC indicates at least one of: at least one time domain pattern for performing at least one SSB transmission associated with inter-node measurement, and at least one time domain pattern for performing at least one SSB measurement associated with inter-node measurement. According to one or more embodiments, the first STC is determined and managed by the CU of the donor IAB node 16 (donor IAB node 16-CU). While FIG. 7 is described in terms of STC management, Block S102 and the description of FIG. 7 is equally applicable to SMTC such that donor IAB node 16, via the CU, may be configured to manage one or more of STC and SMTC for child IAB nodes 16.

Figure 8:
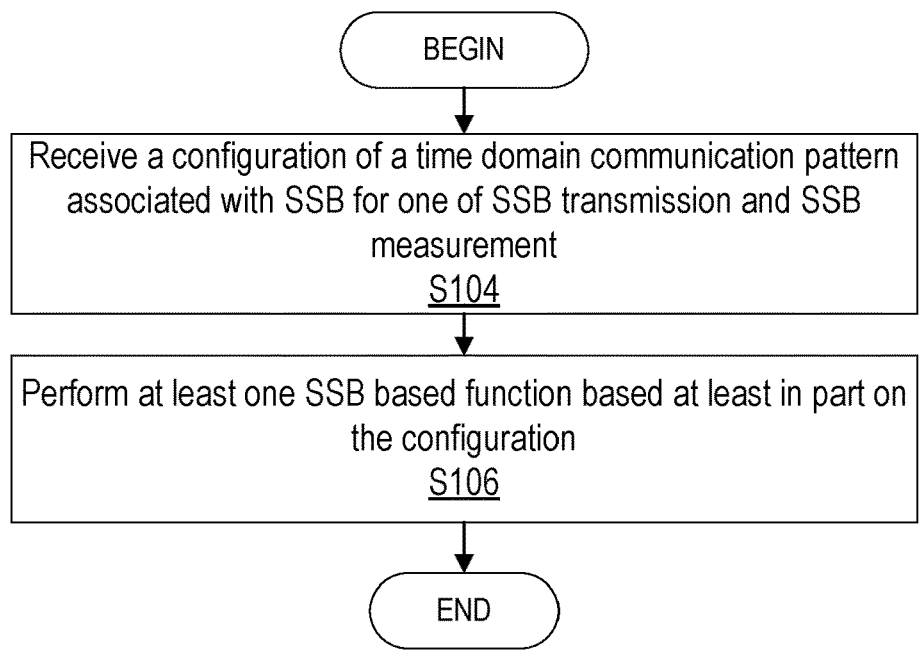
FIG. 8 is a flowchart of another example process in a network node such as a child IAB node according to some embodiments of the present disclosure.

FIG. 8 is a flowchart of another exemplary process in a network node 16 (e.g., child IAB node 16) according to one or more embodiments of the disclosure. One or more Blocks and/or functions performed by child IAB node 16 may be performed by one or more elements of network node 16 such as by SSB unit 28 in processing circuitry 68, processor 70, radio interface 62, etc. In one or more embodiments, network node 16 such as via one or more of processing circuitry 36, processor 38, SSB unit 28, communication interface 32 and radio interface 34 is configured to receive (Block S104) a configuration of a time domain communication pattern associated with SSB for one or SSB transmission and SSB measurement, as described herein. In one or more embodiments, child IAB node 16 such as via one or more of processing circuitry 36, processor 38, SSB unit 28, communication interface 32 and radio interface 34 is configured to perform (Block S106) at least one SSB based function based at least in part on the configuration, as described herein.

According to one or more embodiments, wherein the donor network node 16 is a donor IAB node 16 and the plurality of child network nodes 16 are a plurality of child IAB nodes 16. According to one or more embodiments, the received time domain communication pattern corresponds to at least one STC parameter.

Figure 9:
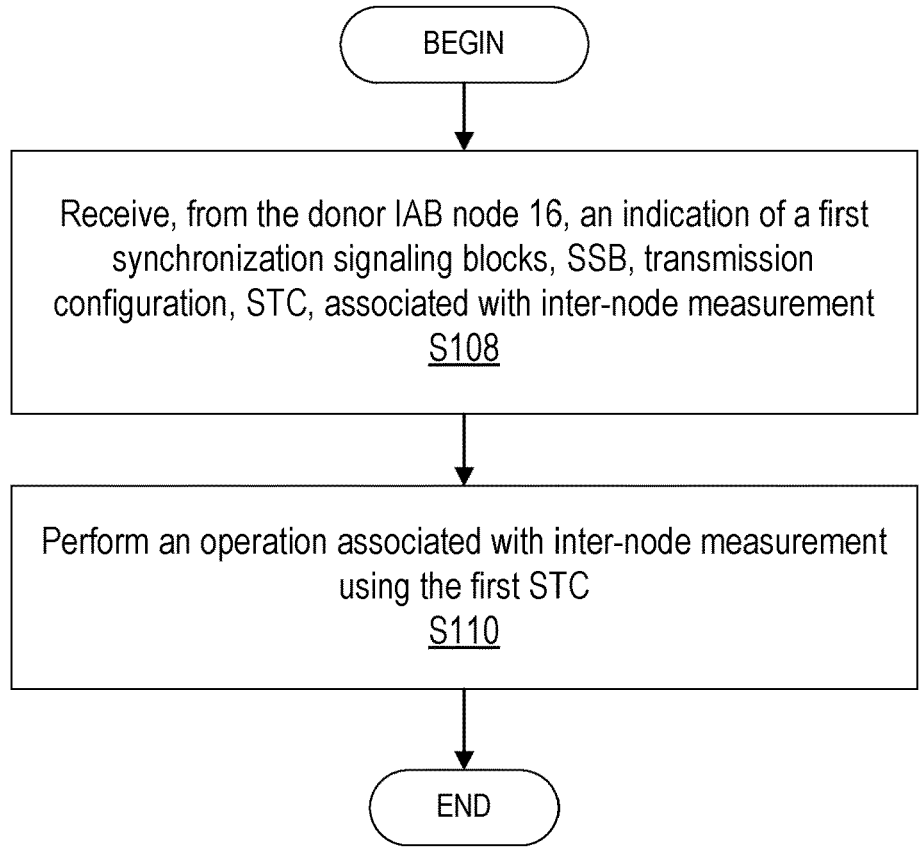
FIG. 9 is a flowchart of another example process in a network node such as a child IAB node according to some embodiments of the present disclosure.

FIG. 9 is a flowchart of another exemplary process in a network node 16 (e.g., child IAB node 16 such as first child IAB node 16) according to one or more embodiments of the disclosure. One or more Blocks and/or functions performed by child IAB node 16 may be performed by one or more elements of network node 16 such as by SSB unit 28 in processing circuitry 68, processor 70, radio interface 62, etc. In one or more embodiments, network node 16 such as via one or more of processing circuitry 36, processor 38, SSB unit 28, communication interface 32 and radio interface 34 is configured to receive (S108), from the donor IAB node 16, an indication of a first synchronization signaling blocks, SSB, transmission configuration, STC, associated with inter-node measurement, as described herein. In one or more embodiments, network node 16 such as via one or more of processing circuitry 36, processor 38, SSB unit 28, communication interface 32 and radio interface 34 is configured to perform (S110) an operation associated with inter-node measurement using the first STC, as described herein.

According to one or more embodiments, the first STC is communicated from a central unit, CU, of the donor IAB node 16 that determined the first STC. According to one or more embodiments, the first STC is different from an STC assigned to the first child IAB node 16 by an operation, administration and management, OAM, unit. According to one or more embodiments, the first STC for the first child IAB node 16 is based at least on STC time pattern information and synchronization signaling block, SSB, measurement timing configuration, SMTC, time pattern information for a plurality of DUs, and mobile terminations, MTs, associated with a plurality of child IAB nodes 16 that are managed by the donor IAB node 16 where the plurality of child IAB nodes includes the first child IAB node 16.

According to one or more embodiments, the first STC indicates whether one or more SSBs are able to be muted by the first child IAB node 16. According to one or more embodiments, the indication of at least the first STC to the first child IAB node 16 is received in system information over an F1 interface between a central unit, CU, of the donor IAB node 16 and the DU of the first child IAB node 16. According to one or more embodiments, the at least the first STC corresponds at least a subset of a plurality of STCs including the first STC; and the processing circuitry 36 is further configured to select the first STC from among the at least the subset of the plurality of STCs.

According to one or more embodiments, the processing circuitry 36 is further configured to transmit an indication that the first STC has been selected. According to one or more embodiments, the first STC indicates at least one of: at least one time domain pattern for performing at least one SSB transmission associated with inter-node measurement, and at least one time domain pattern for performing at least one SSB measurement associated with inter-node measurement. According to one or more embodiments, the operation associated with inter-node measurement using the first STC corresponds to SSB transmission associated with inter-node measurement. While FIG. 9 is described in terms of STC management, Block S108-S110 and the description of FIG. 9 is equally applicable to SMTC such that child IAB node 16 may be configured to receive indications of SMTC as the donor IAB node 16, via the CU, may be configured to manage one or more of STC and SMTC for child IAB nodes 16.

Having described the general process flow of arrangements of the disclosure and having provided examples of hardware and software arrangements for implementing the processes and functions of the disclosure, the sections below provide details and examples of arrangements for network node 16 (i.e., donor IAB node 16) management of time pattern configurations and/or STC for at least one child network node 16 (i.e., child IAB node 16). For example, IAB node 16-CU may be configured to configure and manage STC and/or SMTC implemented by one or more child IAB nodes 16.

Embodiments provide network node 16 (i.e., donor IAB node 16) management of time pattern configurations (e.g., STC and/or SMTC time pattern configurations) for at least one child network node 16 (i.e., child IAB node 16).

The SSB transmission and measurement configurations for inter-node measurements can be determined in a centralized manner. In this document, a network-function is referred to as the center unit which provides configurations for SSB transmission and measurement. The network-function can be located at the network node 16 (i.e., IAB node 16) in the RAN (for example an IAB-CU), or as a separate function residing in the core network 14 (for example the Operation, Administration and Management (OAM) 24 function).

An IAB node 16-DU can be configured with zero, one or multiple STCs (SSB transmission configurations) to transmit Type-1B node-measurement (NM) SSBs, and at least the following information may be provided in each STC:
  SSB center frequency;
  SSB subcarrier spacing;
  SSB transmission periodicity;
  SSB transmission timing offset in half frame(s); and
  The index of SSBs to transmit,
  where SSB transmission timing offset is a new IAB-specific STC parameter in 3GPP Rel-16. In 3GPP Rel-15, SSBs to wireless device 22 can be transmitted at the same time and therefore timing offset between SSBs from different nodes has not been considered earlier. In the IAB case, the DU and MT configuration of STC (SSB transmission configuration) and MeasObj (Measurement Object)/SMTC (i.e., SSB measurement timing configuration and/or SS/PBCH block measurement time configuration) may be provided in a coordinated manner to enable inter-node SSB measurements while helping avoid violating the half-duplex constraint. Potential collision between STC and SMTC time locations may be handled. According to the RAN1 discussions, when there is a collision, it is an IAB internal decision to prioritize SSB transmission or measurement based on diverse performance requirements and other conditions.

A typical situation may be:

The network-function has no information about which SSB transmission may be muted by each IAB node 16

Each IAB node 16 has no information about whether there may be any SSB transmitted or not during a certain SMTC window (due to muting). The node has also no information about how many and which other IAB nodes 16 it can measure in different SMTC windows.

Given these uncertainties it may be hard for an IAB node 16 to perform a proper muting decision, especially if collision between SSB transmission and measurement occurs in multiple time locations. Therefore, the STC time patterns may be generated in a coordinated way when in the network planning stage. It may also be beneficial that STC time patterns can be updated according to the network topology adaptation.

FIGS. 8 and 9 are diagrams of two examples of time pattern configurations among a group of network nodes 16 (i.e., IAB nodes 16). The SSBs with one type of hatching represent the 3GPP Rel-15 SSBs which are targeting to wireless device 22 initial access. These SSBs may be transmitted by all network nodes 16 simultaneously with a periodicity of 20 ms. The SSBs with another type of hatching represent the NM-SSBs that are targeting to other IAB nodes 16 for inter-node discovery/measurement, with a periodicity of 40 ms. In the first example (FIG. 8), all IAB nodes 16 transmit NM-SSBs at the same time (in a similar manner as initial access SSBs) while each IAB node 16 is provided an individual SSB measurement time configuration.

In the second example (FIG. 9), all IAB nodes 16 have the same SMTC configuration, but individual or respective transmission time pattern. Both examples in FIGS. 8 and 9 allow inter-network node 16 measurement but with different advantages/disadvantages. For example, the first scheme (i.e., FIG. 8) may suffers from potentially increased interference level since all other nodes transmit SSBs in the same time slot. The second scheme (i.e., FIG. 9) may only allow measurements for one network node 16 at a time. Improving robustness and flexibility of SSB transmission and measurement may imply increasing time pattern complexity.

Example 1

In one or more embodiments, the STC time pattern(s) may be preconfigured by the OAM 24, but managed (e.g., assigned) by the IAB node 16-CU (i.e., CU in donor IAB node 16) such as via, for example, one or more of processing circuitry 36, processor 38, management unit 26, communication interface 32 and radio interface 34. By this approach, OAM 24 and IAB node 16-CU (also referred to as IAB-CU 16) may share the responsibility of time pattern configuration. The donor IAB node 16-DU is configured to configure and communicate with donor IAB node 16-DU, and donor IAB node 16-DU is configured to configure and communicate with wireless devices 22 and child IAB nodes 16-MTs. Each child IAB node 16 may be configured with a MT and DU where the MT may generally be responsible for upstream communications with the parent IAB node 16 (i.e., upstream IAB node 16, donor IAB node 16) and the DU may generally be responsible for downstream communications with child IAB nodes 16 and wireless devices. The OAM 24 may assign a group of time patterns that can be distributed by each IAB node 16-CU of each IAB node 16. The IAB node 16-CU such as via, for example, one or more of processing circuitry 36, processor 38, management unit 26, communication interface 32 and radio interface 34 may be in charge of coordinating the time pattern(s) to its child IAB nodes 16 such as IAB node 16-DUs of child IAB nodes 16. For example, the IAB node 16-CU may reconfigure a child IAB node 16 by causing a current STC assigned to the child IAB node 16 to be overwritten with another STC where the overwriting may occur at the child IAB node 16 and/or at the IAB node 16-CU (i.e., in SSB time pattern table).

In one or more embodiments, IAB node 16-CU of donor IAB node 16 manages (i.e., assigns, removes, etc.) time (i.e., time domain) patterns (e.g., STC patterns) for one or more child IAB node 16 even though the OAM, in some embodiments, may be initially configured one or more of the time patterns such as for one or more of the child IAB nodes 16. In one or more embodiments, the OAM may determine how to use the configured time patterns such as the method of FIG. 8 or FIG. 9, but the IAB node 16-CU may be the one that decides which child IAB node 16 uses which time pattern.

Figure 10:
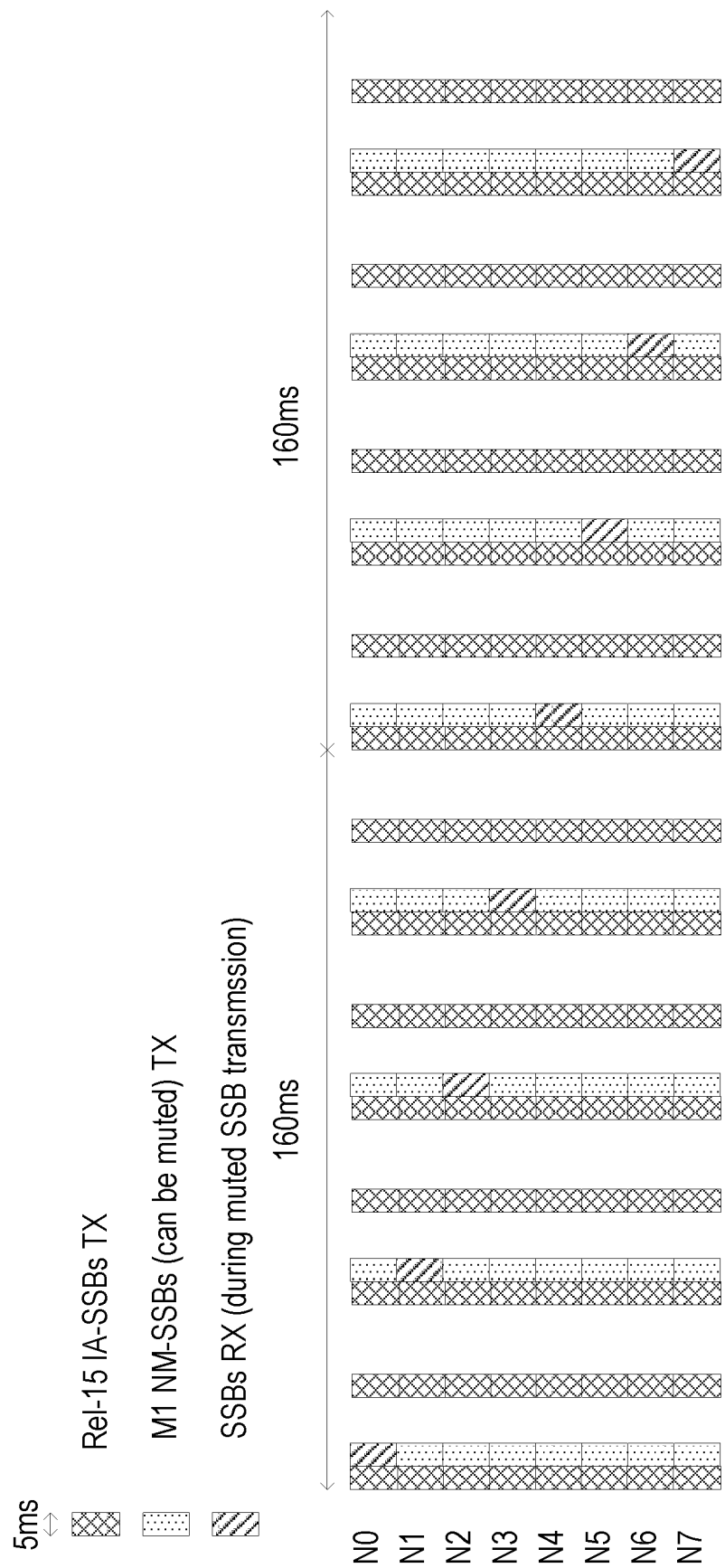
FIG. 10 is a diagram of one example of time pattern configurations for eight IAB nodes according to some embodiments of the present disclosure.
Figure 11:
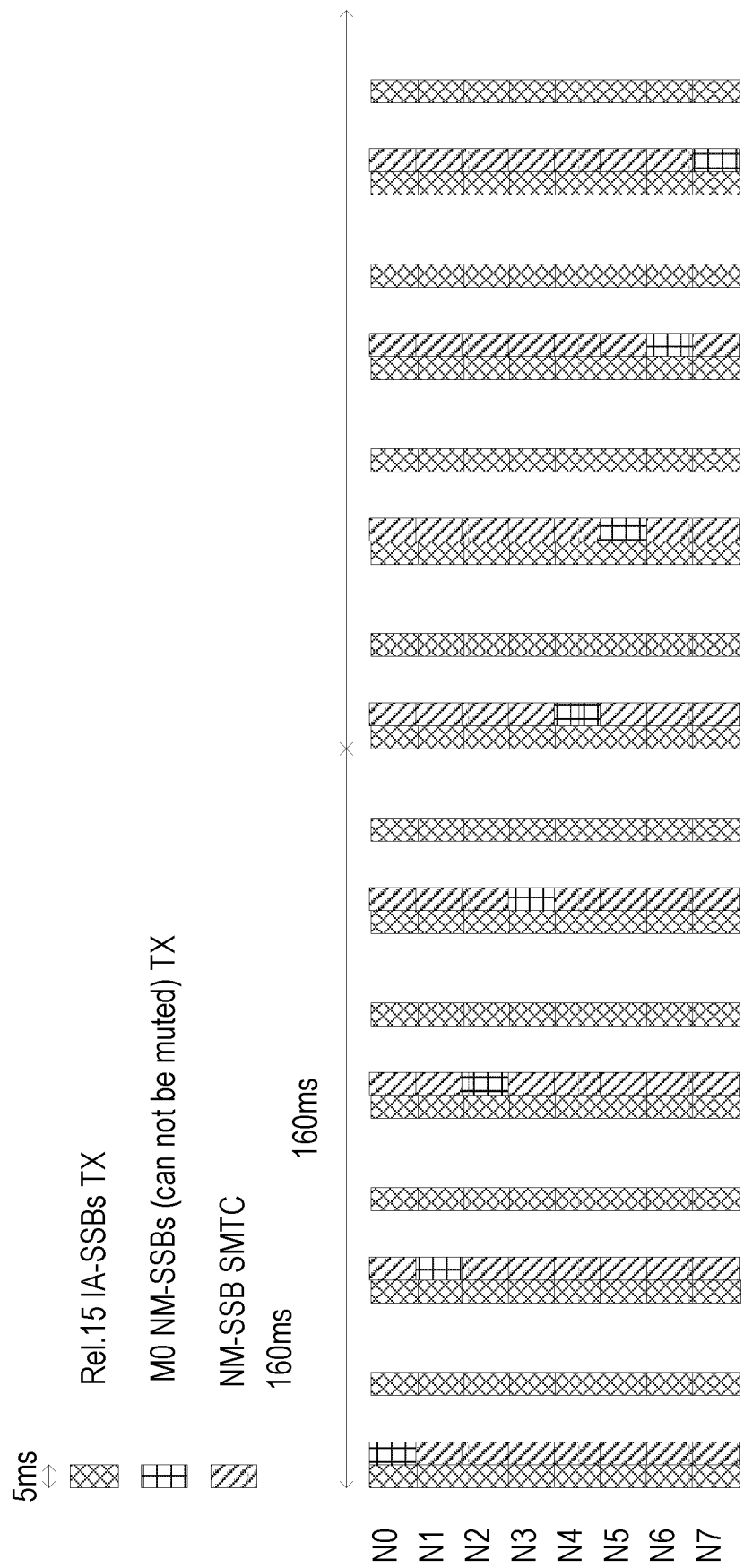
FIG. 11 is a diagram of another example of time pattern configurations for eight IAB nodes according to some embodiments of the present disclosure.
Figure 12:
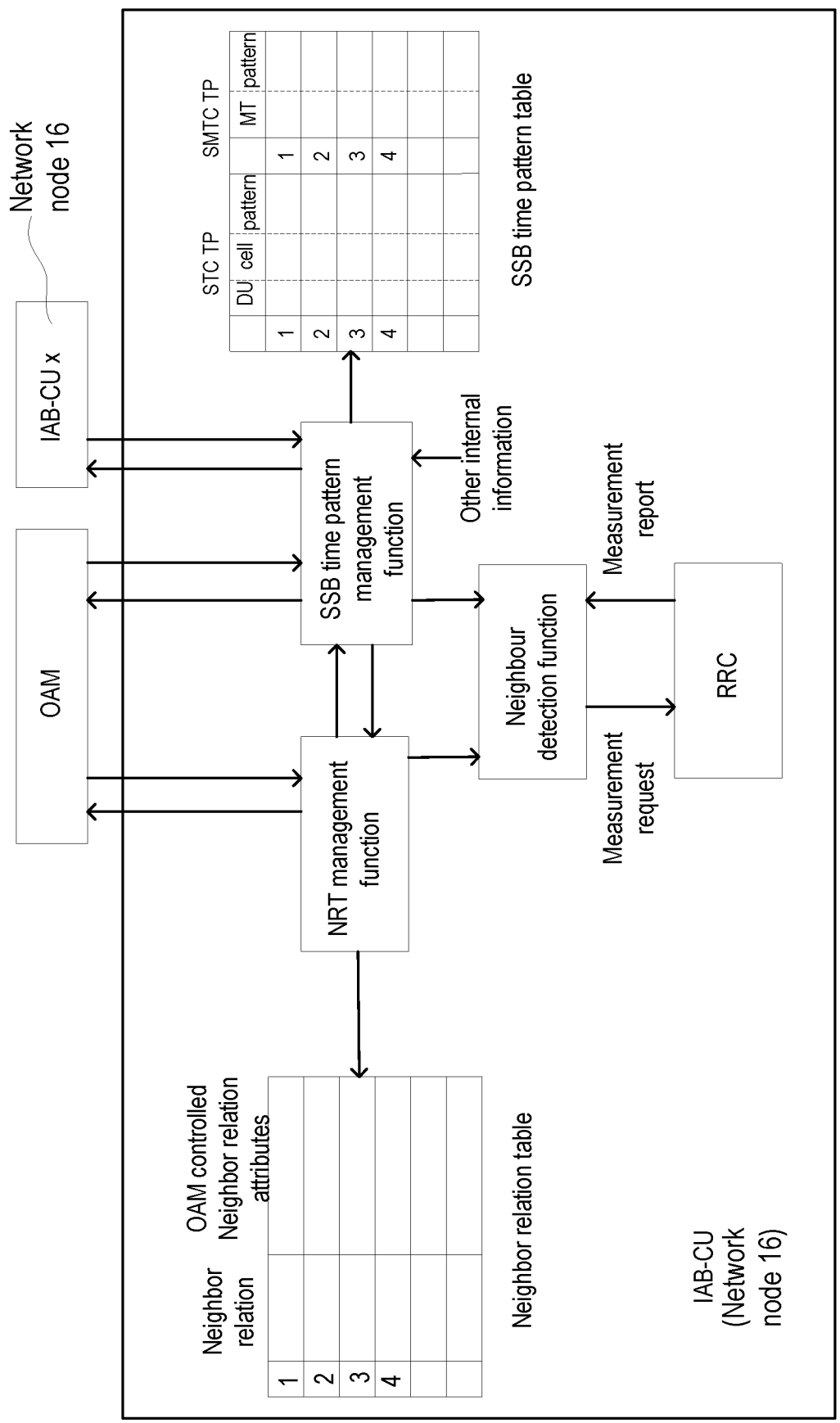
FIG. 12 is a diagram of a SSB time pattern management function located at the IAB-CU according to some embodiments of the present disclosure.

FIG. 10 is a diagram of an example implementation of the SSB Time Pattern Management Function (SSB TPMF) which is associated with an IAB node 16-CU, at least in part because of one or more of:

The IAB node 16-CU of IAB node 16 has information about its child IAB nodes 16 and their time patterns.

The IAB node 16-CU of IAB node 16 such as via, for example, one or more of processing circuitry 36, processor 38, management unit 26, communication interface 32 and radio interface 34 maintains the Neighbor Relation Table (NRT) and NRT management function.

The IAB node 16-CU of IAB node 16 such as via, for example, one or more of processing circuitry 36, processor 38, management unit 26, communication interface 32 and radio interface 34 configures IAB node 16-DU resource(s).

The IAB node 16-CU of IAB node 16 such as via, for example, one or more of processing circuitry 36, processor 38, management unit 26, SSB unit 28, communication interface 32 and radio interface 34 configures SSB measurement request (MeasObj).

The SSB TPMF may receive or accept inputs from one or more of:

the OAM 24 about OAM-indicated set of time patterns and other SSB parameters.

other IAB node 16-CUs on time patterns applied to the IAB nodes 16 (i.e. child IAB nodes 16) which are under their control.

The internal information can include for example:
the network topology.
the IAB node 16-DU/MT capabilities.
the IAB node 16-DU/MT resource configuration.

The output of the TPMF may be for example an SSB Time Pattern Table (SSB TPT) which contains STC time patterns and SMTC time patterns for all IAB node 16-DUs and IAB node 16-MTs managed by the IAB node 16-CU of donor IAB node 16. The IAB node 16-CU may be configured to use the SSB TPT, i.e., information in the SBB TPT, to perform the management functions described herein such as with respect to time pattern management (e.g., STC time pattern management and/or SMTC time pattern management).

To handle time-wise collisions between SSB transmission and measurement, a muting attribute/indication may be included in the STC parameters to indicate whether or not SSB transmission defined by the STC can be muted:

M0-STC: The SSB transmission cannot be muted, i.e., the SSB may be transmitted.

M1-STC: The SSB transmission can be muted, i.e., the SSB does not need to be transmitted if the IAB node 16 may have to measure on an SSB that is time-wise overlapping with the SSB configured for transmission.

Therefore, in one or more embodiments IAB node 16-CU of a donor IAB node 16 may coordinate muting of transmissions at one or more child IAB nodes 16.

SSB STC/SMTC time patterns and M0/M1 attributes may be designed jointly to provide a robust and flexible inter-node measurement strategy. Accordingly, the SSB time pattern management function may also be responsible for the configuration of M0/M1 attribute.

The resulting time patterns and muting attributes could be used for example by the NRT management function and Neighbor detection function for neighbor cell/node detection/measurement and management. The STC patterns and muting attributes may also be new elements to the neighbor relation table since they may also impact topology change, parent-node reselection and handover decisions.

Note that the same scheme of the SSB TPMF can also be located in OAM if the interaction between donor IAB node 16-CU and OAM is automated.

Example 2

In one or more embodiments, the IAB node 16-CU of IAB node 16 can further such as via, for example, one or more of processing circuitry 36, processor 38, management unit 26, communication interface 32 and radio interface 34 assign a sub-set of time pattern(s) to each IAB node 16-DU and provide the IAB node 16-DUs some flexibility to select STC time pattern(s). The IAB node 16-DUs may inform the IAB node 16-CU about the selected time patterns.

Example 3

The IAB node 16-CU of IAB node 16 can such as via, for example, one or more of processing circuitry 36, processor 38, management unit 26, communication interface 32 and radio interface 34 inform the OAM about the time patterns of its child IAB node 16, automated or upon a request.

Example 4

In one embodiment, the time-pattern management function can manage both STC and SMTC time patterns, as well as the muting attribute.

In another embodiment, the TPMF can be responsible for reliable transmission of time-patterns to OAM/IAB-DU/other IAB node 16-CU, by means of coding, re-transmission, collision handling, etc.

Example 5

The STC time pattern coordination can be based on the IAB network topology including neighbor node/cell relationship, multi-hop levels, propagation channels, neighbor IAB-networks relationship, and etc.

Example 6

In one embodiment, the STC time patterns can be per IAB node 16.

In another embodiment, the STC time patterns can be per IAB node 16-DU.

In yet another embodiment, the STC time patterns can be per cell of an IAB node 16-DU.

Example 7

In one embodiment, the STC time domain patterns can be reused based on location information such as distance between the sites.

In another embodiment, the STC time domain patterns can be reused for different IAB nodes 16-CUs.

In yet another embodiment, the STC time domain patterns can be reused based on network topology information, such as the hop level, odd/even nodes.

Example 8

In one embodiment, the IAB node 16-CU of IAB node 16 can such as via, for example, one or more of processing circuitry 36, processor 38, management unit 26, SSB unit 28, communication interface 32 and radio interface 34 indicate the IAB node 16-DU about STC using 3GPP Rel-15 System Information over the F1 interface.

In another embodiment, the IAB node 16-CU of IAB node 16 can such as via, for example, one or more of processing circuitry 36, processor 38, management unit 26, SSB unit 28, communication interface 32 and radio interface 34 indicate the IAB node 16-DU about STC using IAB specific System Information over the F1 interface.

In another embodiment, the IAB node 16-CU of IAB node 16 can such as via, for example, one or more of processing circuitry 36, processor 38, management unit 26, SSB unit 28, communication interface 32 and radio interface 34 indicate the IAB node 16-DU about STC using OAM signaling.

Example 9

In one embodiment, the IAB node 16-CU of network node 16 can such as via, for example, one or more of processing circuitry 36, processor 38, management unit 26, SSB unit 28, communication interface 32 and radio interface 34 exchange time-pattern information with other IAB node 16-CUs to coordinate topology adaption/node measurement between different IAB node 16-CUs over Xn interface.

Example 10

In one embodiment, the SSB time pattern management function may be automated.

In another embodiment, the SSB time pattern management function could be event-triggered. For example, the triggering event (predefined IAB event) may be a change in IAB network topology such as by the addition and/or removable of an IAB node 16 (e.g., child IAB node 16). In one or more embodiments, the IAB node 16-CU may be configured to adjust one or more of the time patterns assigned to one or more child IAB nodes 16 based on the type of event.

Example 11

In an embodiment, the STC patterns (i.e., time pattern indicated by STC) can be pre-configured before the deployment of an IAB node 16-DU.

Example 12

In one embodiment, the reconfiguration/update of STC time pattern can be initialized by the OAM functionality, as OAM→IAB node 16 CU→IAB node 16 DU In another embodiment, the reconfiguration/update of STC time pattern can be initialized by the IAB node 16-CU, as IAB node 16-CU→IAB node 16-DU In yet another embodiment, the reconfiguration/update of STC time pattern can be initialized by the IAB node 16-DU, as IAB node 16-DU→IAB node 16-CU→IAB node 16-DU Example 13

A similar scheme of the SSB TPMF can also be located in OAM if the interaction between IAB node 16-CU and OAM is automated.

One or more examples described above may be based at least in part on one or more other examples described above.

ADDITIONAL EXAMPLES

Example A1. A donor network node 16 (i.e., donor IAB node 16) configured to communicate with a wireless device 22 (WD 22), the network node 16 configured to, and/or comprising a radio interface 34 and/or communication interface 32 and/or comprising processing circuitry 36 configured to: manage a plurality of time domain communication patterns for a plurality of child network nodes 16 (i.e., IAB child node 16).

Example A2. The donor network node 16 of Example A1, wherein each of the time domain communication patterns is associated with SSB for one or SSB transmission and SSB measurement.

Example A3. The donor network node 16 of Example A1, wherein the donor network node 16 is a donor IAB node 16 and the plurality of child network nodes 16 are a plurality of child IAB nodes 16.

Example A4. The donor network node 16 of Example A1, wherein each time domain communication pattern corresponds to at least one synchronization signaling blocks, SSB, transmission configuration, STC, parameter.

Example B1. A method implemented by a donor network node 16 configured to communicate with a wireless device 22 (WD 22), the method comprising: managing a plurality of time domain communication patterns for a plurality of child network nodes 16.

Example B2. The method of Example B1, wherein each of the time domain communication patterns is associated with SSB for one or SSB transmission and SSB measurement.

Example B3. The method of Example B1, wherein the donor network node 16 is a donor IAB node 16 and the plurality of child network nodes 16 are a plurality of child IAB nodes 16.

Example B4. The network node 16 of Example B1, wherein each time domain communication pattern corresponds to at least one synchronization signaling blocks, SSB, transmission configuration, STC, parameter.

Example C1. A first child network node 16 configured to communicate with a donor network node 16 that manages a plurality of time domain communication patterns for a plurality of child network nodes 16 including the first child network node 16, the first child network node 16 configured to, and/or comprising a radio interface 34 and/or communication interface 32 and/or comprising processing circuitry 36 configured to:

receive a configuration of a time domain communication pattern associated with SSB for one or SSB transmission and SSB measurement; and perform at least one SSB based function based at least in part on the configuration.

Example C2. The first child network node 16 of Example C1, wherein the donor network node 16 is a donor IAB node 16 and the plurality of child network nodes 16 are a plurality of child IAB nodes 16.

Example C3. The first child network node of Example C1, wherein the received time domain communication pattern corresponds to at least one synchronization signaling blocks, SSB, transmission configuration, STC, parameter.

Example D1. A method implemented by a first child network node 16 configured to communicate with a donor network node 16 that manages a plurality of time domain communication patterns for a plurality of child network nodes 16 including the first child network node 16, the method comprising:

receiving a configuration of a time domain communication pattern associated with SSB for one or SSB transmission and SSB measurement; and performing at least one SSB based function based at least in part on the configuration.

Example D2. The method of Example D1, wherein the donor network node 16 is a donor IAB node 16 and the plurality of child network nodes 16 are a plurality of child IAB nodes 16.

Example D3. The method of Example D1, wherein the received time domain communication pattern corresponds to at least one synchronization signaling blocks, SSB, transmission configuration, STC, parameter.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

Abbreviation Explanation

3GPP 3rd Generation Partnership Project
5G 5th Generation
ANR Automatic Neighbor Relation
CD-SSB Cell Defining SSB
CGI Cell Global Identifier
CU Central Unit
DU Distributed Unit
eNB E-UTRAN NodeB
EN-DC E-UTRAN-NR Dual Connectivity
FR Frequency Range
GSNC Global Synchronization Channel Number
ID Identity/Identifier
LTE Long Term Evolution
LSB Least Significant Bit
MCC Mobile Country Code
MeasObj Measurement Object (RRC)
MIB Master Information Base
MNC Mobile Network Code
NGC 5GC; 5G Core Network
NR New Radio (5G)
NRT Neighbor Relation Table
NR-U NR Unlicensed
OAM Operation, Administration and Management
PBCH Physical Broadcast Channel
PCI Physical Cell Identity
PDCCH Physical Downlink Control Channel
PLMN Public Land Mobile Network
RAT Radio Access Technology
RMSI Remaining Minimum System Information
RRC Radio Resource Control
RSRP Reference Signal Received Power
RSRQ Reference Signal Received Quality
SCS Subcarrier Spacing
SFN System Frame Number
SIB System Information Block
SON Self-Organizing Network
SSB Synchronization Signal Block
TPMF Time Pattern Management Function
TS Technical Specification
UE User Equipment
UTRAN Universal Terrestrial Radio Access Network
Xn Interface between two gNBs.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A donor integrated access backhaul, IAB, node configured with a distributed unit, DU, for communicating with a wireless device and configured with a central unit, CU, for communicating with at least a first child IAB node, the donor IAB node comprising:
   processing circuitry configured to:
      indicate a determined first synchronization signaling blocks, SSB, transmission configuration, STC, for the at least first child IAB node, to the at least first child IAB node, the first STC being associated with inter-node measurement;
      receive, from an operation, administration and management, OAM, unit, an indication of a second STC that has been preconfigured, the second STC being different from the first STC; and
      reconfigure the first child IAB node from the second STC to the first STC by causing the second STC to be overwritten with the first STC, the reconfiguration of the first child IAB node including managing time patterns for the first child IAB node.

2. The donor IAB node of claim 1, wherein the first STC is determined by the CU of the donor IAB node.

3. The donor IAB node of claim 1, wherein the processing circuitry is further configured to:
   determine a plurality of STCs for a plurality of child IAB nodes, the plurality of STCs being associated with inter-node measurement and including the first STC and the plurality of child IAB nodes including the first child IAB node; and
   indicate the plurality of STCs to the plurality of child IAB nodes.

4. The donor IAB node of claim 1, wherein the determination of the first STC for the first child IAB node to perform inter-node measurement is based at least on STC time pattern information and synchronization signaling block, SSB, measurement timing configuration, SMTC, time pattern information for a plurality of DUs, and mobile termination, MTs, associated with a plurality of child IAB nodes and managed by the donor IAB node.

5. The donor IAB node of claim 1, wherein the first STC indicates whether one or more SSBs are able to be muted by the first child IAB node.

6. The donor IAB node of claim 1, wherein the indication of the first STC to the first child IAB node is provided in system information over an F1 interface between the CU of the donor IAB node and a DU of the first child IAB node.

7. The donor IAB node of claim 1, wherein the processing circuitry is configured to:
   determine at least a subset of a plurality of STCs for the first child IAB node, the at least the subset of the plurality of STCs including the first STC; and
   indicate the at least the subset of the plurality of STCs to the first child IAB node to participate in inter-node measurement using one of the at least the subset of the plurality of STCs.

8. The donor IAB node of claim 1, wherein the processing circuitry further configured to:
   determine a predefined IAB event occurred; and
   trigger the determination of the first STC for the first child IAB node based at least on the occurrence of the predefined IAB event.

9. The donor IAB node of claim 1, wherein the first STC indicates at least one of:
   at least one time domain pattern for performing at least one SSB transmission associated with inter-node measurement; and
   at least one time domain pattern for performing at least one SSB measurement associated with inter-node measurement.

10. The donor IAB node of claim 1, wherein the first STC is determined and managed by the CU of the donor IAB node.

11. A first child integrated access backhaul, IAB, node configured with a distributed unit, DU, for communicating with a wireless device and configured with a mobile termination, MT, for communicating with a donor IAB node, the first child IAB node comprising:
   processing circuitry configured to:
      receive, from the donor IAB node, an indication of a first synchronization signaling blocks, SSB, transmission configuration, STC, associated with inter-node measurement;
      change from a second STC to the first STC due to the donor IAB node causing the second STC to be overwritten with the first STC, the change being associated with management of time patterns for the first child IAB node by the donor IAB node, the donor IAB node having received an indication from an operation, administration and management, OAM, unit that the second STC has been preconfigured, the second STC being different from the first STC; and
      perform an operation associated with inter-node measurement using the first STC.

12. The first child IAB node of claim 11, wherein the first STC is communicated from a central unit, CU, of the donor IAB node that determined the first STC.

13. The first child IAB node of claim 11, wherein the first STC is different from an STC assigned to the first child IAB node by an operation, administration and management, OAM, unit.

14. The first child IAB node of claim 11, wherein the at least the first STC corresponds at least a subset of a plurality of STCs including the first STC; and
   the processing circuitry being further configured to select the first STC from among the at least the subset of the plurality of STCs.

15. The first child IAB node of claim 11, wherein the operation associated with inter-node measurement using the first STC corresponds to SSB transmission associated with inter-node measurement.

16. A method implemented by a donor integrated access backhaul, IAB, node that is configured with a distributed unit, DU, for communicating with a wireless device and configured with a central unit, CU, for communicating with at least a first child IAB node, the method comprising:
   indicating a determined first synchronization signaling blocks, SSB, transmission configuration, STC, for the at least first child IAB node, to the at least first child IAB node, the first STC being associated with inter-node measurement;
   receiving, from an operation, administration and management, OAM, unit, an indication of a second STC that has been preconfigured, the second STC being different from the first STC; and
   reconfiguring the first child IAB node from the second STC to the first STC by causing the second STC to be overwritten with the first STC, the reconfiguration of the first child IAB node including managing time patterns for the first child IAB node.

17. The method of claim 16, wherein the first STC is determined by the CU of the donor IAB node.

18. The method of claim 16, further comprising:
   determining a plurality of STCs for a plurality of child IAB nodes, the plurality of STCs being associated with inter-node measurement and including the first STC and the plurality of child IAB nodes including the first child IAB node; and
   indicating the plurality of STCs to the plurality of child IAB nodes.

19. The method of claim 16, further comprising:
   determining a predefined IAB event occurred; and
   triggering the determination of the first STC for the first child IAB node based at least on the occurrence of the predefined IAB event.

20. A method implemented by a first child integrated access backhaul, IAB, node that is configured with a distributed unit, DU, for communicating with a wireless device and configured with a mobile termination, MT, for communicating with a donor IAB node, the method comprising:
   receiving, from the donor IAB node, an indication of a first synchronization signaling blocks, SSB, transmission configuration, STC, associated with inter-node measurement;
   changing from a second STC to the first STC due to the donor IAB node causing the second STC to be overwritten with the first STC, the change being associated with management of time patterns for the first child IAB node by the donor IAB node, the donor IAB node having received an indication from an operation, administration and management, OAM, unit that the second STC has been preconfigured, the second STC being different from the first STC; and performing an operation associated with inter-node measurement using the first STC.

21. The method of claim 20, wherein the first STC is communicated from a central unit, CU, of the donor IAB node that determined the first STC.

22. The method of claim 20, wherein the first STC is different from an STC assigned to the first child IAB node by an operation, administration and management, OAM, unit.

23. The method of claim 20, wherein the at least the first STC corresponds at least a subset of a plurality of STCs including the first STC; and the method further comprising selecting the first STC from among the at least the subset of the plurality of STCs.

24. The method of claim 20, wherein the operation associated with inter-node measurement using the first STC corresponds to SSB transmission associated with inter-node measurement.

\* \* \* \* \*